(No Model.)  4 Sheets—Sheet 2.

S. WATSON.
WIRE FENCE MACHINE.

No. 322,872. Patented July 21, 1885.

Witnesses:
T. F. Holden
Geo. R. Byington

Inventor
Sam Watson
per Hallock & Hallock
Attys (No Model.) 4 Sheets—Sheet 3.
S. WATSON.
WIRE FENCE MACHINE.
No. 322,872. Patented July 21, 1885.
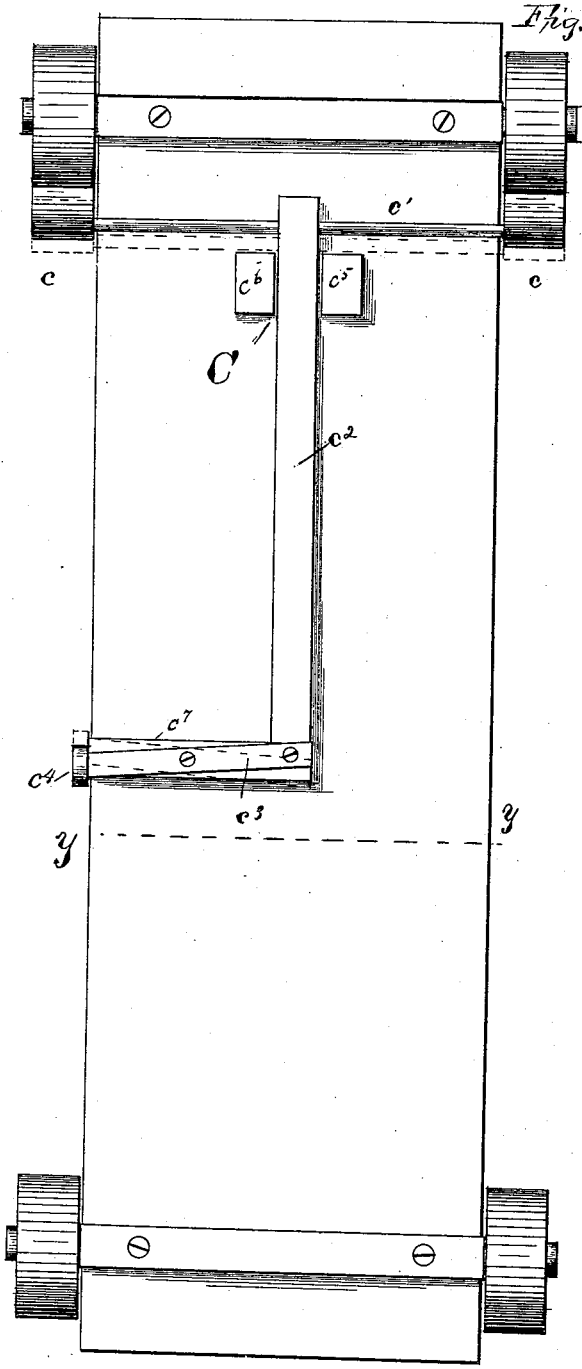
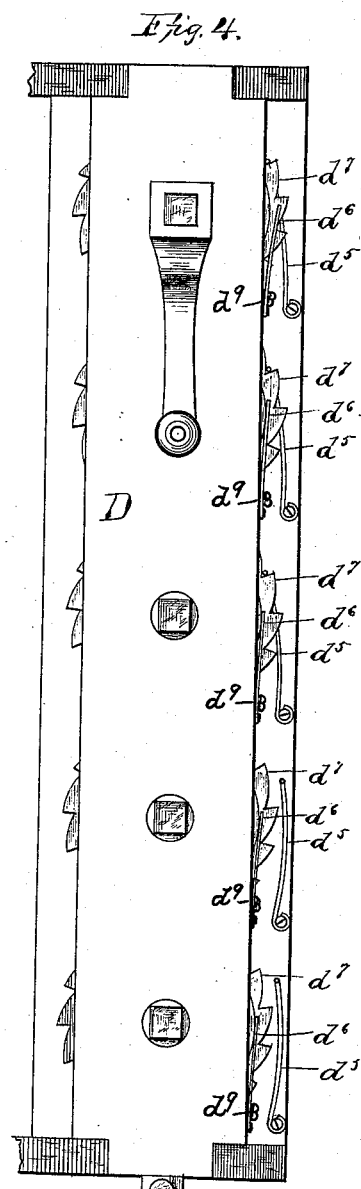

(No Model.)
S. WATSON.
WIRE FENCE MACHINE.
No. 322,872.  Patented July 21, 1885.
4 Sheets—Sheet 4.
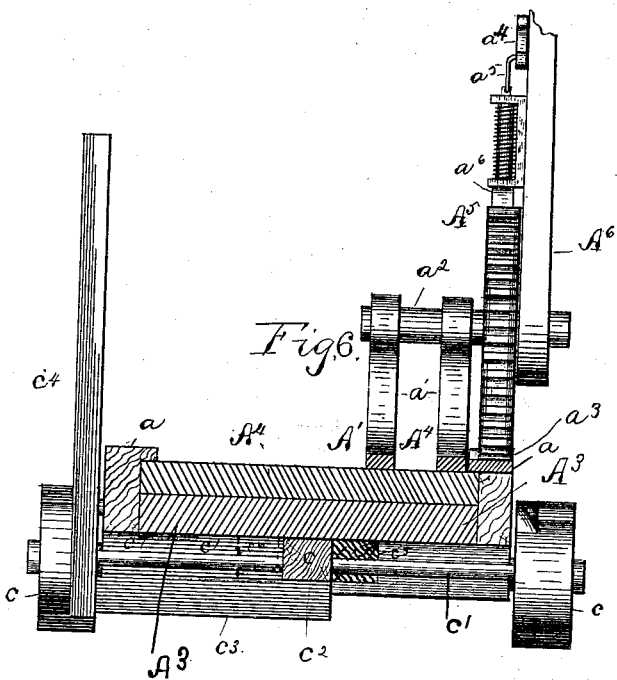
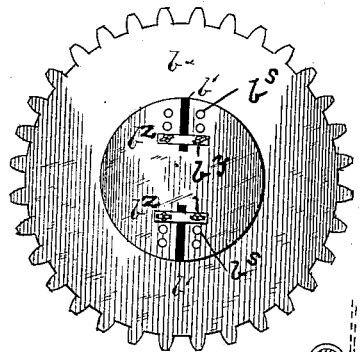
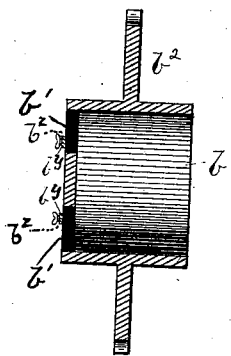
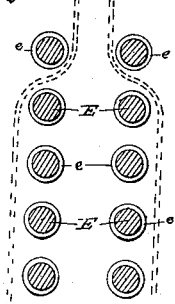
Witnesses:
T. F. Holden.
Geo. R. Byington
Inventor
Sam Watson
per Hallock & Hallock
Attys.

UNITED STATES PATENT OFFICE.

SAM WATSON, OF STRAUGHN, INDIANA.

WIRE-FENCE MACHINE.

SPECIFICATION forming part of Letters Patent No. 322,872, dated July 21, 1885.

Application filed April 29, 1885. (No model.)

*To all whom it may concern:*

Be it known that I, SAM WATSON, a citizen of the United States, residing at Straughn, in the county of Henry and State of Indiana, have invented certain new and useful Improvements in Wire-Fence Machines; and I do hereby declare the following to be a full, clear, and exact description of the invention, such as will enable others skilled in the art to which appertains to make and use the same.

My invention relates to that class of fence-machines in which the pickets and wires are bound together and the fence put up in one operation.

The invention consists of constructions and combinations, all as will hereinafter be described, and pointed out in the claims, reference being had to the accompanying drawings, in which—

Figure 1:
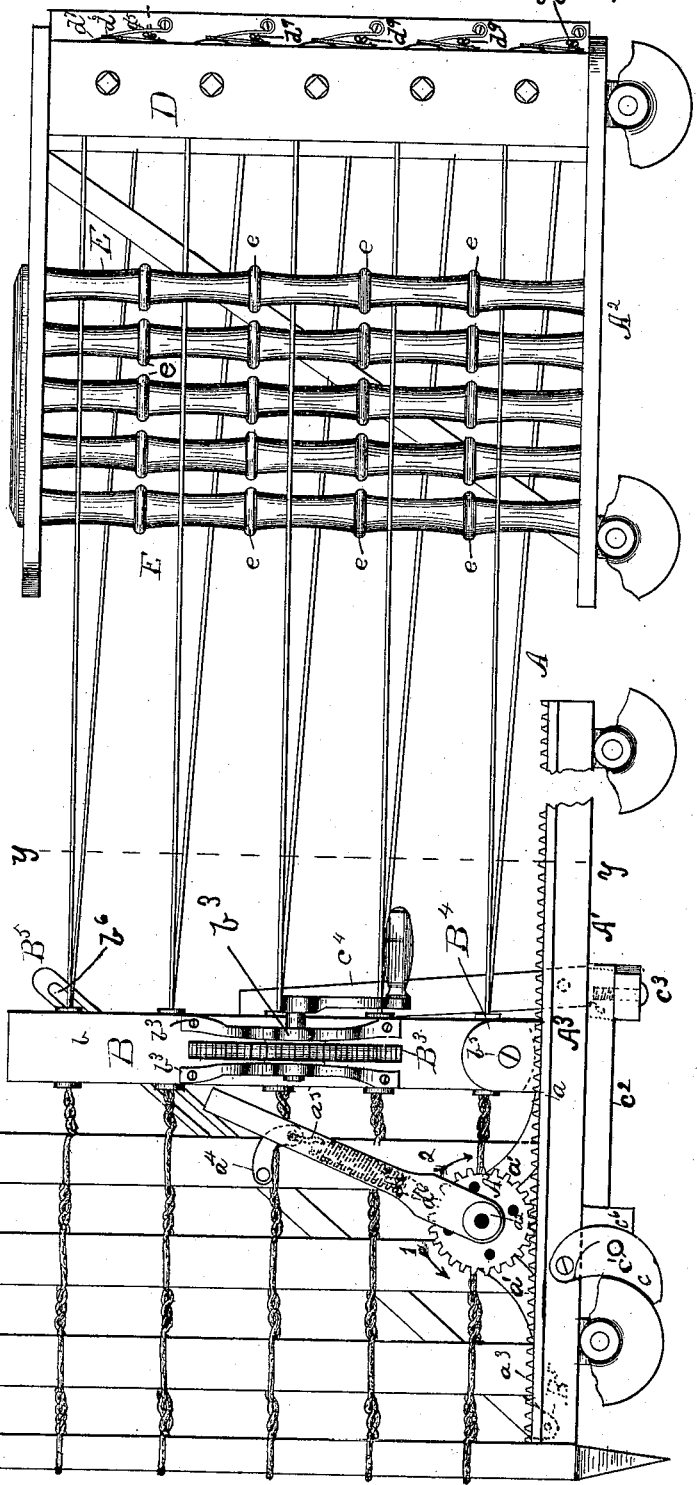
Figure 2:
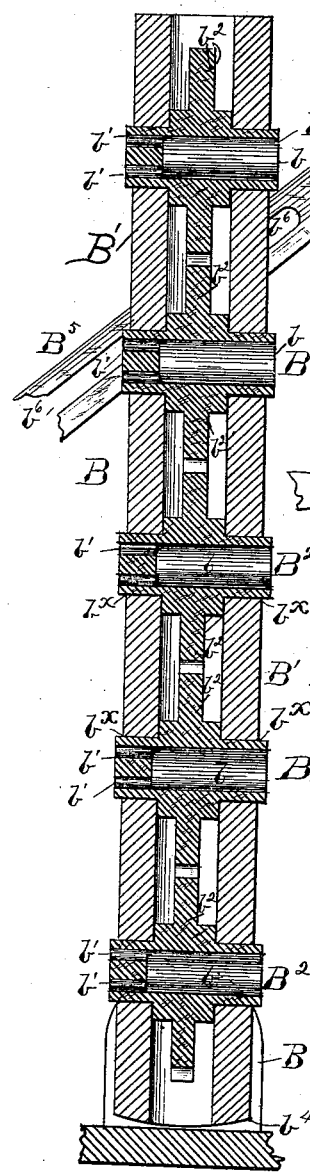
Figure 3:
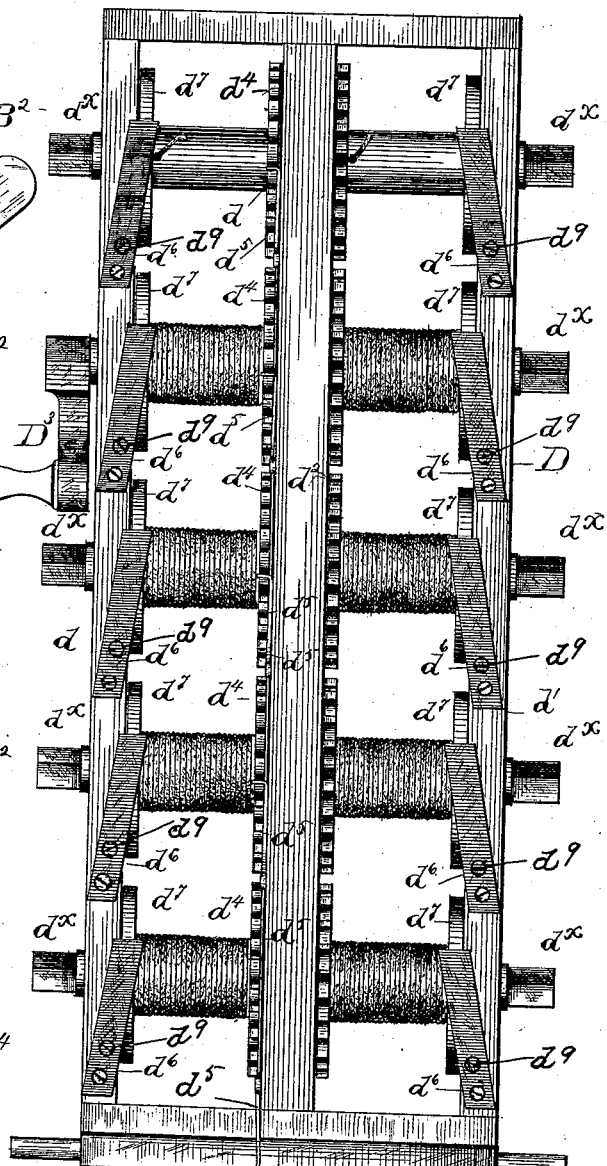
Figure 9:
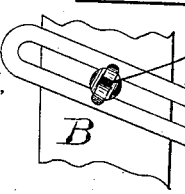

Figure 1 represents a side elevation of the machine when at work; Figs. 2, a vertical section of the twisting-frame; Fig. 3, an end elevation of the spool or reel frame; Fig. 4, a side elevation of the spool or reel frame; Fig. 5, a plan view showing the brake mechanism. Fig. 6, a section on line $y\,y$, Fig. 5, the part $A^4$ being shifted so that the standards $a$ would be on the line $y\,y$, Fig. 1; Fig. 7, a front elevation of a twisting-head, showing elongated slots; Fig. 8, a section of the device shown in Fig. 7, the line of section being through the slots; Fig. 9, a horizontal section through the posts E, showing the manner in which the wires pass around them.

A represents the base-frame formed of two sections, $A'$ and $A^2$. The section $A'$ carries the twisting-frame and $A^2$ the reels and tension devices. Section $A'$ is formed of two parts, $A^3$ and $A^4$. Part $A^3$ has strips $a$, which overlap the sides of part $A^4$ and form guides for the latter. Upon the part $A^4$ are standards $a'$, which support a shaft, $a^2$, having the cog-wheels $A^5$ keyed thereon. This cog-wheel meshes with the rack-bar $a^3$ on one of the strips $a$, and when operated by the lever $A^6$ moves the part $A^4$ backward or forward upon the part $A^3$. This lever is journaled on the shaft $a^2$, and is provided with a spring-pawl, $a^6$, which engages with the wheel between the cogs, so that when the lever is pulled one way the wheel will turn in that direction, and force the part $A^4$ backward or forward, as may be desired. By pressing downwardly upon the handle $a^4$ the link $a^5$ will lift the pawl from the cogs, so that the lever can be shifted to another space. By this construction I am enabled to move the part $A^4$ as far as desired, either backward or forward, and thus have complete control of the shifting parts, an object which is of the greatest importance, as will hereinafter be explained.

Upon the part $A^4$ is the upright twisting device B, which consists of the frame $B'$ and heads $B^2$. The frame $B'$ is provided with openings $b^4$ for the twisting-heads $B^2$, which are journaled therein. The heads $B^2$ consist of tubular parts $b$, having eyes $b'$, and the pinion $b^2$, which meshes with the pinion next to it. The tubular part $b$ forms the journals of the head and projects into the openings or bearings $b^4$ in the frame. If desired, the eyes $b'$ may be elongated to form slots, as shown in Figs. 7 and 8.

To regulate the size of the slots or eyes $b'$, the bars $b^2$ are provided. These bars have set-screws $b^7$, which screw into openings $b^8$ in the needle-head. The wire passes between the bars and bottom of the slots, and when the twisting-frame is in a vertical position the slot is reduced by placing the bar over the openings or holes nearest the bottom of the slot, and fixing said bar in place by means of the set screws. When the machine is tilted, the bar is moved to the next set of holes, so that the wire will not be bent in passing through the eyes. In other words, the slot permits the wire to pass out without bending whenever the frame is tilted, and the bar serves as a guide or bearing-face for the wire, so that it will not have too great play while being twisted.

Upon the frame are brackets $b^3$, which serve as bearings for the gear-wheel $B^3$, that meshes with one of the pinions, $b^2$, of the head. The gear-wheel is provided with a crank, by means of which motion is imparted to it and the heads. The frame $B'$ is rounded at its lower end, $b^4$, and provided with trunnions $b^5$, which are journaled in the standards $B^4$ to permit of the twisting-frame being tilted when the machine is worked on hilly or uneven ground, and keep the pickets in line. The tubular heads allow the wire to adjust itself to the variant conditions of the ground, so that no interference with the pivoted adjustment of the twisting-frame will take place.

To hold the twisting-frame in position, an arm, $B^5$, is provided. This arm is pivoted to the part $A^4$, and is provided at its upper end with a slot, $b^6$, through which a screw, $b^7$, is passed into the twisting-frame. When it is desired to incline the twisting-frame out of its normal position, the screw is loosened and the twisting-frame is free to move into the position desired. The screw slides in the slot of the arm, which adjusts itself to the movements of the loom. When the latter has reached its proper position, it will be rigidly held in place by simply tightening the screw.

Upon the under side of the part $A^3$ is a brake-gear, which consists of brake-shoes $c$, pivoted to the part $A^3$ in front of its wheels, a rod, $c'$, connecting the brake-shoes, a bar, $c^2$, through which the rod $c'$ passes, a lever, $c^3$, to one end of which the draw-bar $c^2$ is pivoted, and the hand-lever $c^4$, which is pivoted to the other end of the lever $c^3$ and fulcrumed upon the part $A^3$. Upon the under side of part $A^3$ are studs $c^5$ and $c^6$, which guide the bar $c^2$ and the cleat $c^7$, in which the lever $c^3$ is fulcrumed. In Fig. 6 the view of stud $c^6$ is obscured by the cleat $c^7$. Its position, however, is indicated by dotted lines. The object of this brake will hereinafter be described.

The section $A^2$, as before stated, carries the reel and tension devices. The reel-frame D is composed of three uprights, $d$ $d'$ $d^2$, in which the reels are journaled in two vertical series. One journal of each reel $D'$ projects outside the frame, and is provided with square ends $d^\times$ for a crank, $D^3$, which may be used to wind the wire on each reel and to set each wire separately. One of the main objects of this construction is to adjust each wire so that when the twisting-frame is inclined toward the pickets the upper reels will give off sufficient wire to make up for the increased distance between it and the twisting-frame, and take it up when the twisting-frame has been righted or brought to a vertical position. If the twisting-frame should be inclined toward the reels, the upper reels should be made to rewind enough wire to compensate for the decreased distance between them and the upper part of the twisting-frame. By this means the tension of all the wires can be made uniform, no matter what the position of the twisting-frame. If desired, each reel may be provided with a ratchet-wheel, $d^4$, and a pawl, $d^5$, which is pivoted to the upright $d^2$. On the uprights $d$ and $d'$ are flat springs $d^6$, which are in contact with the flange $d^7$ of the reels to prevent the wire from being drawn off too fast. In other words, it acts as a brake. The contact between the reel and the spring may be regulated by a set-screw, $d^9$. The principal devices, however, on which I rely for tension are the posts E, arranged in two parallel rows, Fig. 9, and having the raised part $e$ to indicate the space for each wire. These posts, in addition to the tension they give to the wires, also take out all the kinks. In the drawings the wires are shown as passing between two of the posts. If I desire to increase the tension, the wires are passed between three or more posts, as may be necessary.

To rig the machine, a wire is wound upon each reel separately. When a sufficient quantity has been wound upon them, the loose ends are passed between the vertical posts, which take out the kinks, and also act as tension-regulators. The wires are now passed through the tubular heads, which have two eyes, one eye for each of the reels, on the same horizontal plane. The wires are now attached to the starting-post F. The part $A^2$ is placed at any desired distance from the first post, and the part $A'$ will be between said post and part $A^2$. The length of the wires is adjusted or made the same by winding the surplus upon the reels.

The operation of the machine is as follows: The part $A'$ is moved almost against the post, and held there by means of the brake, and about three twists given to the wires by means of the heads. The part $A^4$ is now moved back a sufficient distance to permit of the insertion of a picket between the wires and next to the twisted part. The twisting-frame is now forced against the picket by turning the cog-wheel $A^5$ in the direction of the arrow 1. This movement jams the picket tight against the twisted part of the wires. The heads are given a half-turn to twist the wire between the twisting-frame and picket, which is now clamped tight in place. The twisting-frame is now gradually moved away from the picket by reversing the action of the lever $A^6$, as indicated by the arrow 2. The twisting-heads are revolved at the same time, and, by reason of the tension upon the wire, make a long twist between the pickets, without breaking the fiber or destroying their elasticity, which would be the case if the twisting-frame were held solidly against the picket while the heads were revolved. When the next picket is put in place, the operation is the same, except that the motion of the twisting-head is reversed, so that the wires will not be twisted between the twisting-frame and the reel. When the part $A^4$ has been worked forward upon the part $A^3$ until it is near the front end, the brake upon the wheels is loosened and the part $A'$ moved back sufficiently to permit of the part $A^4$ being moved to its former position at the front end of the machine. The wires will keep the part $A'$ in line with the post and part $A^2$, and thus prevent deviating from the course laid out. When the part $A'$ has been moved up to part $A^2$, the latter is again moved off and affixed in place at any suitable distance.

What I claim as new is—

1. In a wire-fence machine, the combination of the part or truck $A^3$, the part $A^4$, held in place by ways on the part $A^3$ and connected to the latter by mechanism for shifting its position, a twisting-frame pivoted upon the part $A^4$, and the part $A^2$, having the reels and tension devices.

2. In a wire-fence machine, the combination of the stationary part $A^3$, the sliding part $A^4$, the twisting-frame having the tubular twisters and pivoted upon part $A^4$, and reels and tension devices for regulating the tension of the wire, substantially as described.

3. In a wire-fence machine, the combination of the parts $A^3$ and $A^4$, the part $A^3$ having the overlapping strips and rack-bar $a^3$, and the part $A^4$ having the cog-wheel journaled thereon and meshing with rack-bar $a^3$, and having the spring-pawl, substantially as described, whereby the twisting-frame can be forced against the picket and gradually withdrawn as the wire is twisted, substantially as described.

4. In a wire-fence machine, the combination of the part $A^3$, the part $A^4$, having the twisting-frame pivoted thereto, and the arm $B^5$ pivoted to the base and provided with the slot for the set-screws by which it is attached to the twisting-frame, substantially as described.

5. In a wire-fence machine, a tubular twisting-head having the elongated eyes and the bars for regulating the size of the eyes, substantially as and for the purpose described.

6. In a wire-fence machine, the combination of the twisting-frame and its supports and the part $A^2$, having the reel frame and reels, and the parts E, interposed between the reels and the twisting-frame, substantially as described.

In testimony whereof I affix my signature in presence of two witnesses.

SAM WATSON.

Witnesses:
R. W. SWAIN,
DANIEL T. WHITE.